(12) United States Patent
Chen (10) Patent No.: US 10,563,781 B2
(45) Date of Patent: Feb. 18, 2020

(54) VALVE CORE

(71) Applicant: KUCHING INTERNATIONAL LTD., Tanzih Township, Taichung County (TW)

(72) Inventor: Mei-Li Chen, Tanzih Township, Taichung County (TW)

(73) Assignee: KUCHING INTERNATIONAL LTD., Tanzih Township (TW)

(*) Notice: Subject to any disclaimer, the term of this patent is extended or adjusted under 35 U.S.C. 154(b) by 57 days.

(21) Appl. No.: 15/957,439

(22) Filed: Apr. 19, 2018

(65) Prior Publication Data

US 2019/0323617 A1    Oct. 24, 2019

(51) Int. Cl.
*F16K 11/074*    (2006.01)
*F16K 11/085*    (2006.01)

(52) U.S. Cl.
CPC ...... *F16K 11/0743* (2013.01); *F16K 11/0856* (2013.01); *C02F 2307/06* (2013.01); *Y10T 137/86863* (2015.04)

(58) Field of Classification Search
None
See application file for complete search history.

(56) References Cited

U.S. PATENT DOCUMENTS

| 2,209,989 | A | * | 8/1940 | McCanna | F16K 3/10 137/625.29 |
|---|---|---|---|---|---|
| 2,613,056 | A | * | 10/1952 | Hughes | F16K 11/0743 137/625.29 |
| 2,777,515 | A | * | 1/1957 | Stirling | F16K 11/0743 137/624.18 |
| 4,115,276 | A | * | 9/1978 | Kelly | B01D 29/668 137/625.29 |
| 6,394,127 | B1 | * | 5/2002 | Creswell | B01D 35/04 137/544 |
| 8,613,293 | B2 | * | 12/2013 | Bolgar | F16K 11/0743 137/597 |
| 8,695,635 | B1 | * | 4/2014 | Wang | F16K 11/0787 137/597 |
| 2007/0074772 | A1 | * | 4/2007 | Yang | F16K 11/0743 137/625.46 |
| 2016/0305101 | A1 | * | 10/2016 | Liu | F16K 11/0787 |
| 2016/0341323 | A1 | * | 11/2016 | Wu | C02F 1/42 |
| 2017/0089474 | A1 | * | 3/2017 | Zhan | F16K 11/0743 |
| 2017/0363216 | A1 | * | 12/2017 | Schmitt | E03C 1/04 |

* cited by examiner

*Primary Examiner* — John Fox
(74) *Attorney, Agent, or Firm* — Egbert Law Offices, PLLC (57) ABSTRACT

A valve core includes housing, which is a hollow cylindrical structure with both ends defined as an open end and a through end respectively; a base mounted on the housing to close the open end of the housing; a fixed valve plate mounted on the base, which is unable to rotate relative to the base; a movable valve plate which is rotationally arranged on the fixed valve plate; a manipulation assembly, one end of which is configured on the movable valve plate to manipulate the movable valve plate to rotate relative to the fixed valve plate, and the other end of which is extended to penetrate the through end of the housing.

3 Claims, 11 Drawing Sheets

//VALVE CORE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a valve core, and more particularly to an innovative structural type of which the water inlet and outlet are from the bottom for connection to a water purification device.

2. Description of Related Art Including Information Disclosed Under 37 CFR 1.97 and 37 CFR 1.98

Because the flow channel in a conventional valve core has not been redesigned to hastily install a water purification device at its front end, when the valve core closes its flow channel, the back pressure generated relative to the water purification device and the water pressure continuously acting on the water purification device by the raw water makes the water purification device sustain double pressure for a long time to cause leakage. Water purification devices are usually installed in a concealed place of the interior of the water tank, causing the situation to become quite serious when leakage is found. If a leak detector is further installed, it will cause consumers unnecessary expenses.

BRIEF SUMMARY OF THE INVENTION

The technical features of the present invention to solve the problems are mainly that the valve core utilizes a novel flow channel design and communicating mode between the base, fixed valve plate, and the movable valve plate to achieve practical progress and better industrial economy (utilization) benefits of wide range of usage, prolonging service life of water purification device, avoiding purified water blended with raw water, and multiple uses.

DETAILED DESCRIPTION OF THE INVENTION

Referring to FIGS. 1 to 4, which are preferred embodiments of the valve core of the present invention, the valve core comprises housing 10, which is a hollow cylindrical structure with both ends defined as an open end and a through end respectively; a base 20 mounted on the housing 10 to close the open end of the housing 10; a fixed valve plate 30 mounted on the base 20, which is unable to rotate relative to the base 20; a movable valve plate 40 which is rotationally arranged on the fixed valve plate 30; a manipulation assembly 50, one end of which is configured on the movable valve plate 40 to manipulate the movable valve plate 40 to rotate relative to the fixed valve plate 30, and the other end of which is extended to penetrate the through end of the housing 10.

Figure 5:
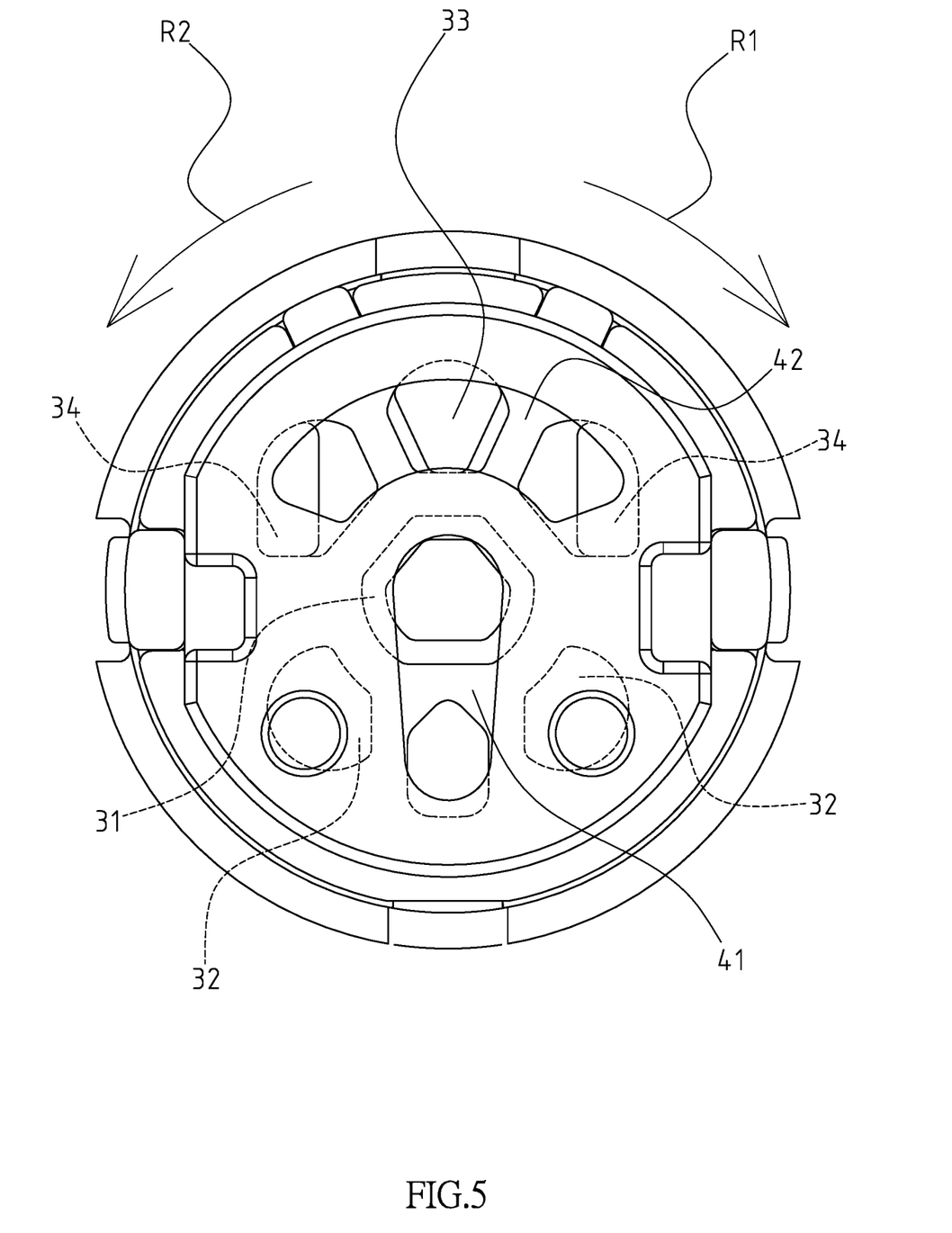
FIG. 5 is a top view of the movable valve plate mounted on the fixed valve plate of the present invention in a closed state.
Figure 5A:
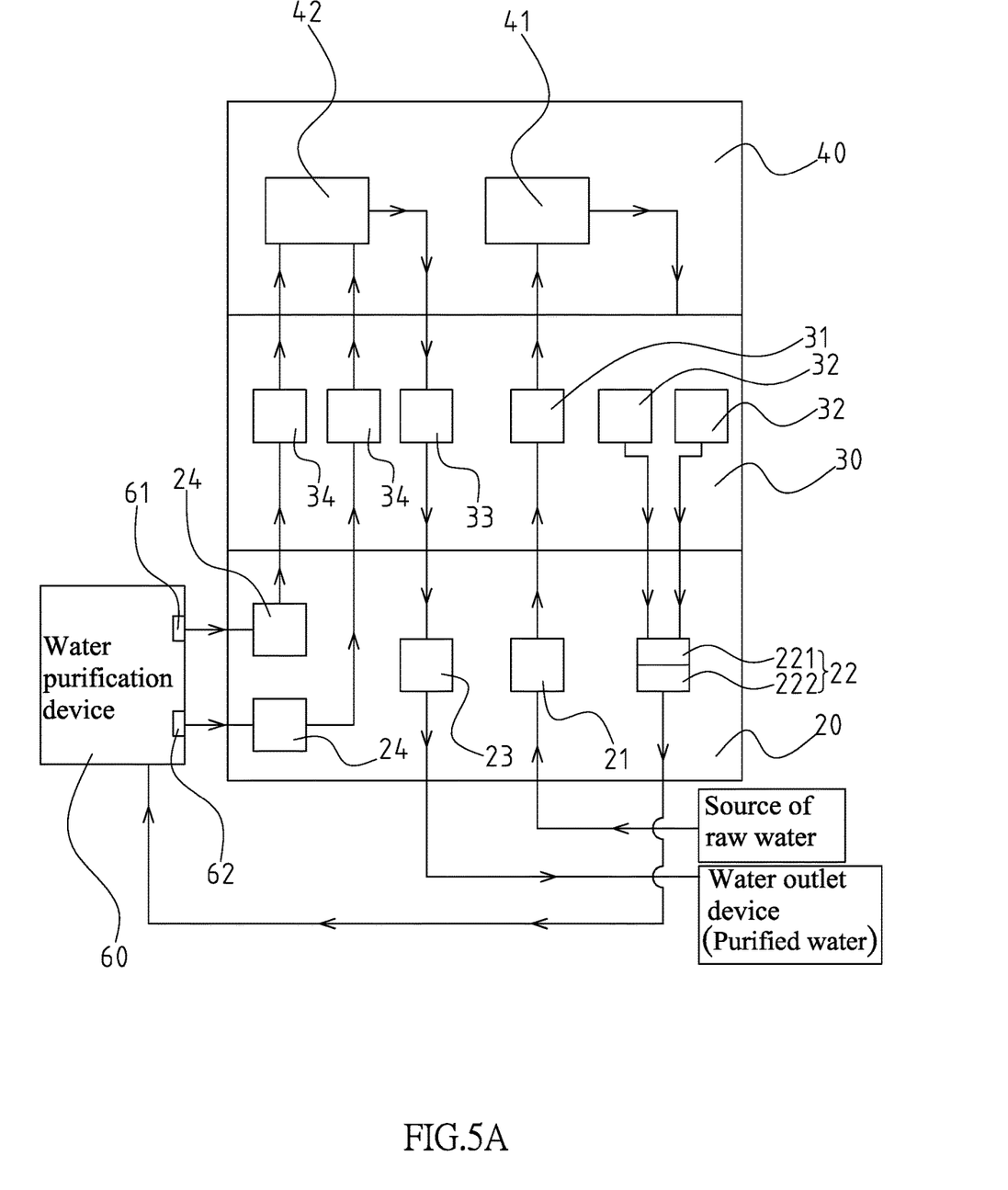
FIG. 5A is a schematic flow channel diagram of the present invention in a closed state.
Figure 5B:
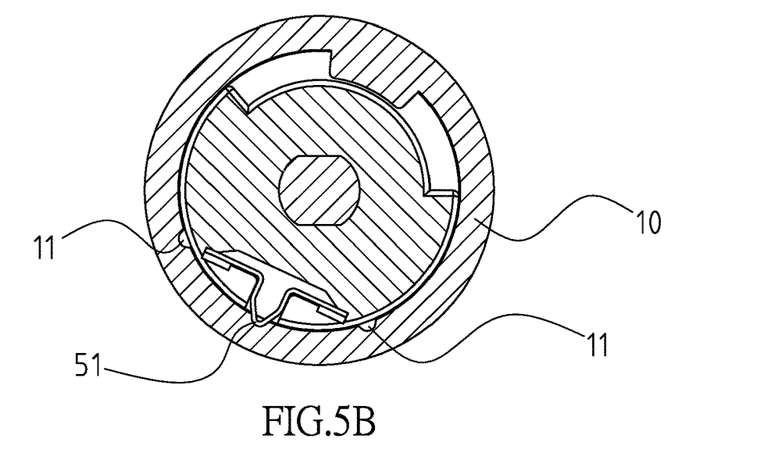
FIG. 5B is a schematic diagram of the manipulation assembly in clamping and positioning of the present invention in a closed state.

Referring to FIG. 5B, the inner wall of the housing 10 forms at least two grooves 11. In the preferred embodiment of the present invention, the number of the groove 11 is set to three, and the three grooves 11 are arranged at an equal interval.

Figure 3:
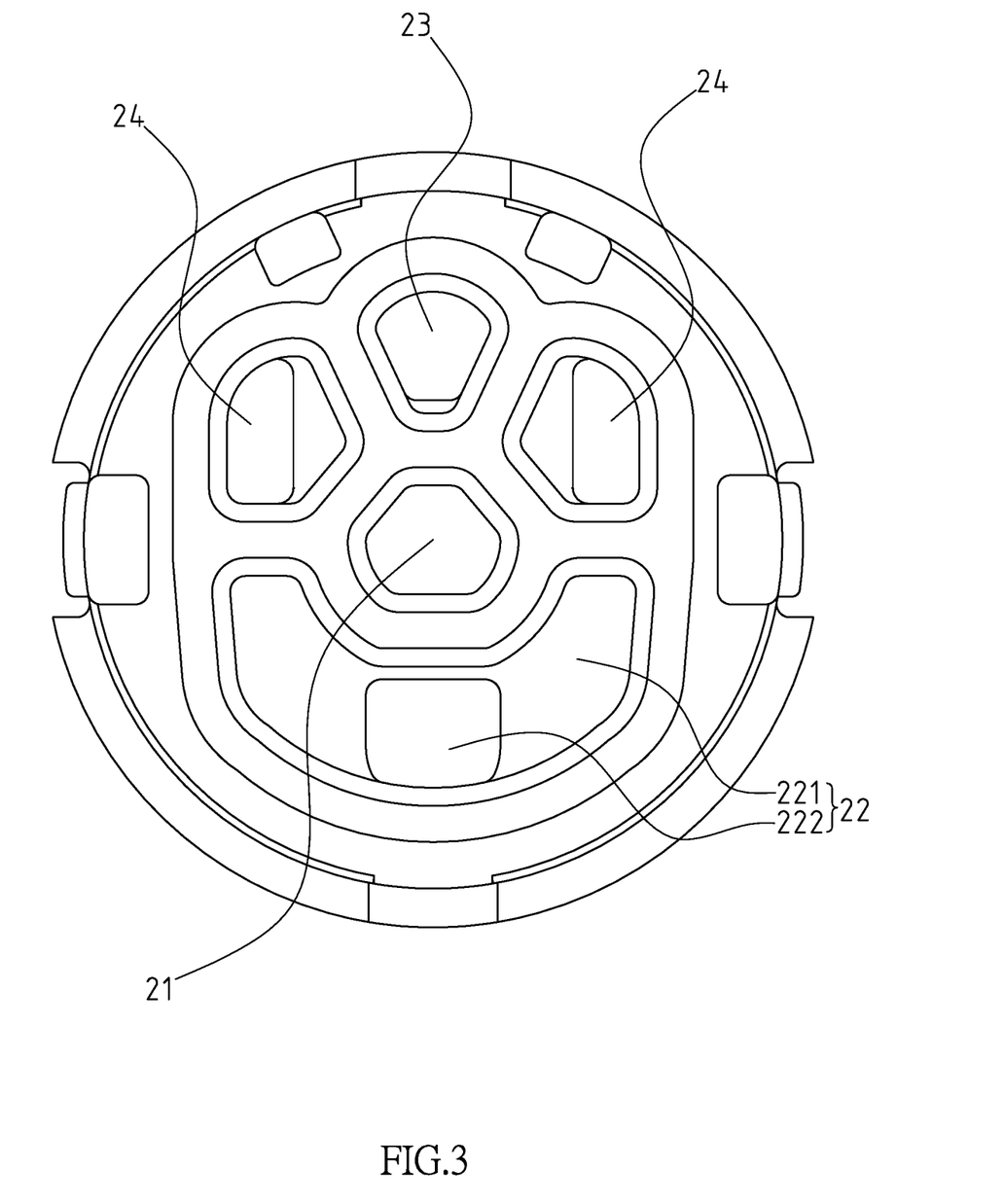
FIG. 3 is a top view of the base of the present invention.

The base 20 comprises a first water-inlet channel 21 axially formed at the central portion of the base; the first water-inlet channel 21 is used to connect to a source of raw water (not shown); a first water-outlet channel 22 axially formed on the outer edge of the first water-inlet channel 21 on the base 20; the first water-outlet channel 22 is used to connect to the water inlet of a water purification device 60. Referring to FIG. 3, the first water-outlet channel 22 comprises an arc-shaped groove 221 which is arranged corresponding to the contour of the fixed valve plate 30 and a water outlet 222 which is formed on the bottom surface of the arc-shaped groove 221, wherein the water outlet 222 is used to connect to the water inlet of a water purification device 60; a second water-outlet channel 23 axially formed on the outer edge of the first water-inlet channel 21 of the base 20; the second water-outlet channel 23 is used to connect to a water outlet device (not shown); at least one second water-inlet channel 24 axially formed on the base 20; the at least one second water-inlet channel 24 is used to connect to at least one water outlet of the water purification device 60. In a preferred embodiment of the present invention, both ends of the second water-outlet channel 23 of the base 20 are respectively formed with a second water-inlet channel 24. The two second water-inlet channels 24 of the base 20 are respectively used to connect to a corresponding water outlet on the water purification device 60, and the two ends of the arc-shaped groove 221 are extended respectively toward the second water-inlet channel 24 of the base 20. The two second water-inlet channels 24 are connected to the first water outlet 61 and the second water outlet 62 of the water purification device 60.

Figure 4:
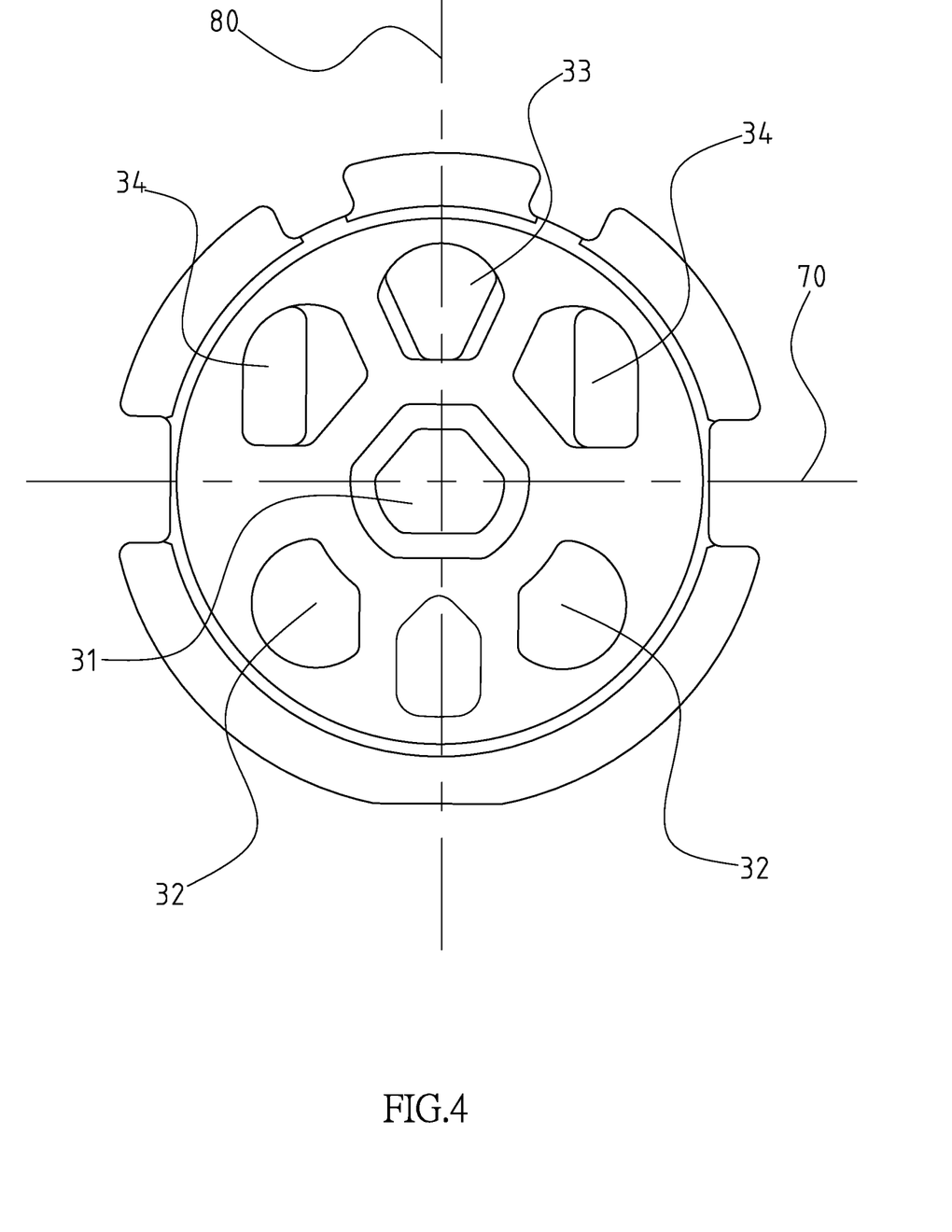
FIG. 4 is a top view of the fixed valve plate of the present invention.

The fixed valve plate 30 comprises a first water-inlet channel 31 axially formed at the central portion of the fixed valve plate; the first water-inlet channel 31 of the fixed valve plate 30 and the first water-inlet channel 21 of the base 20 communicate with each other; at least one first water-outlet channel 32 axially formed on the fixed valve plate 30, and the at least one first water-outlet channel 32 of the fixed valve plate 30 and the first water-outlet channel 22 of the base 20 communicate with each other; a second water-outlet channel 33 axially formed on the fixed valve plate 30, and the second water-outlet channel 33 of the fixed valve plate 30 and the second water-outlet channel 23 of the base 20 communicate with each other; and at least one second water-inlet channel 34 axially formed on the fixed valve plate 30, and at least one second water-inlet channel 34 of the fixed valve plate 30 and the at least one second water-inlet channel 24 of the base 20 communicate with each other. Referring to FIG. 4, in a preferred embodiment of the present invention, both ends of the second water-outlet channel 33 of the fixed valve plate 30 are respectively formed with a second water-inlet channel 34. The second water-inlet channel 34 of each fixed valve plate 30 and the corresponding second water-inlet channel 24 on the base 20 communicate with each other. Two first water-outlet channels 32 are formed on the fixed valve plate 30. Each first water-outlet channel 32 on the fixed valve plate 30 communicates with the corresponding end of the arc-shaped groove 221. As shown in FIG. 4, the end surface of the movable valve plate 40 attached to the fixed valve plate 30 is divided into four quadrants by the mutually orthogonal X-axis 70 and Y-axis 80. The two second water-inlet channels 34 of the fixed valve plate 30 are respectively located in the first quadrant and the second quadrant, and the two first water-outlet channels 32 of the fixed valve plate 30 are respectively located in the third quadrant and the fourth quadrant, wherein the second water-inlet channels 34 on the first quadrant corresponds to the first water-outlet channels 32 on the third quadrant in usage, and the second water-inlet channel 34 on the second quadrant corresponds to the first water-outlet channels 32 on the fourth quadrant in usage. For the fixed valve plate 30, the two second water-inlet channels 34 on the first and second quadrants respectively communicate with the first water outlet 61 and the second water outlet 62 of the water purification device 60 via a corresponding second water-inlet channel 24 of the base 20.

Figure 1:
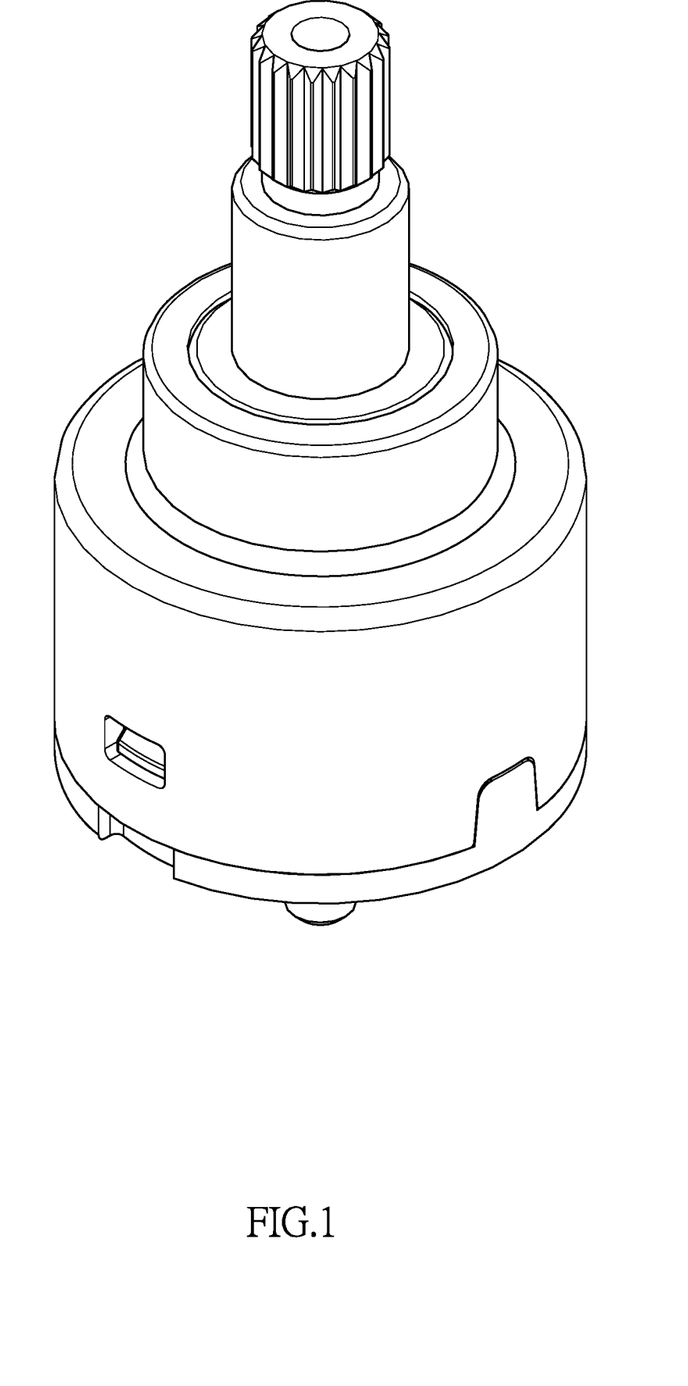
FIG. 1 is a perspective view of the present invention.
Figure 2:
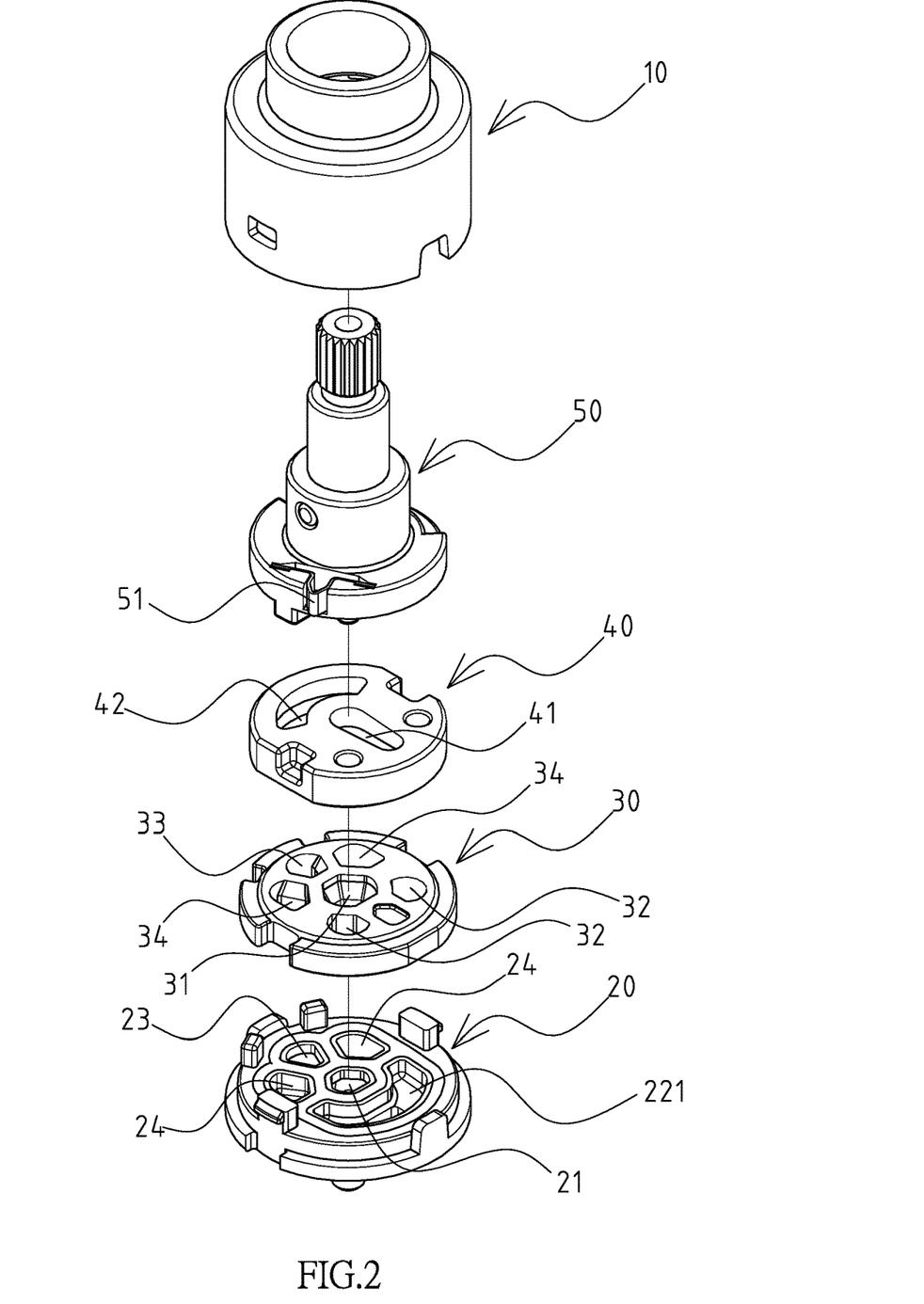
FIG. 2 is an exploded perspective view of the present invention.
Figure 6:
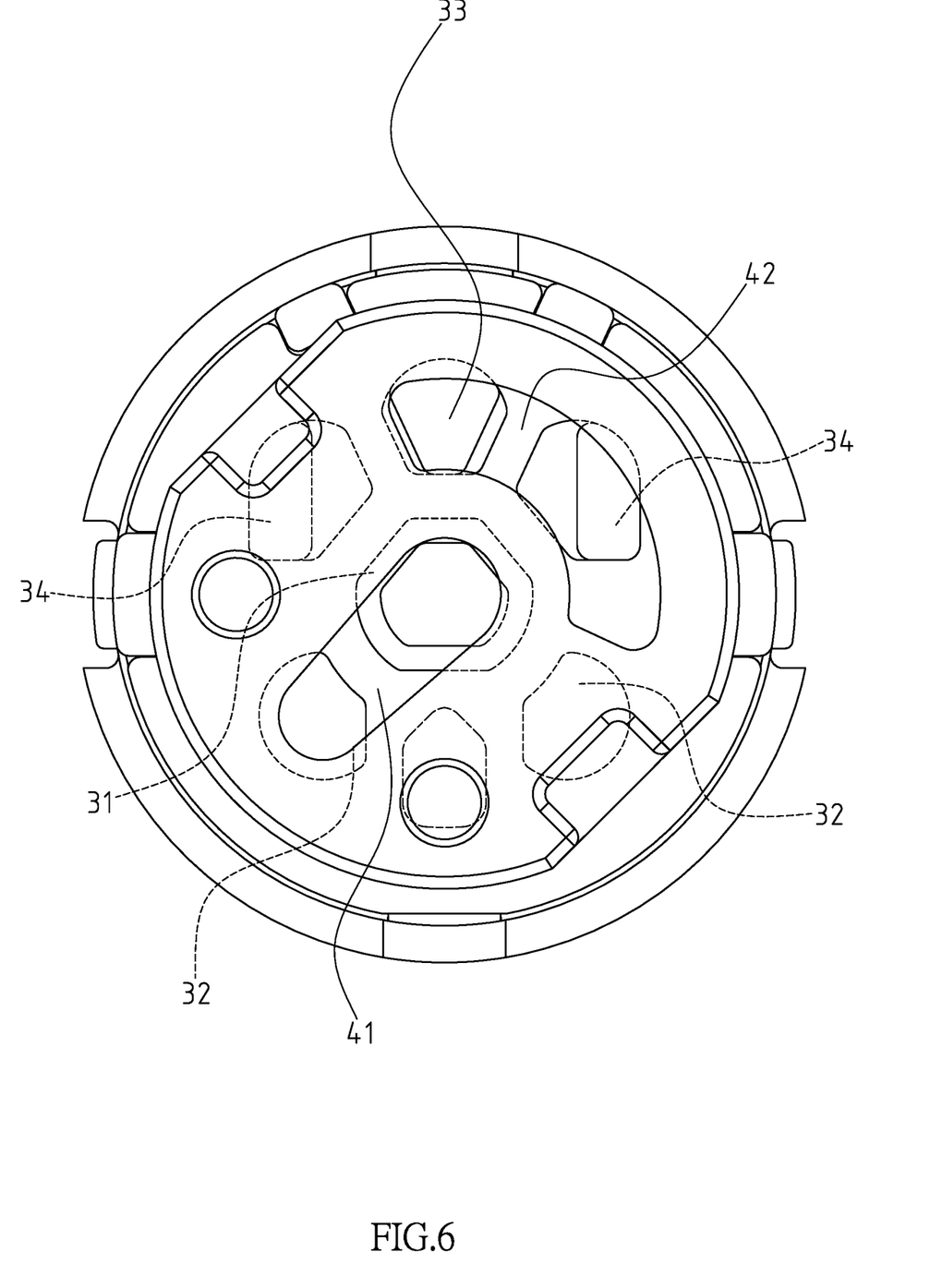
FIG. 6 is a schematic diagram showing the action of the present invention in a first water discharge state.
Figure 6A:
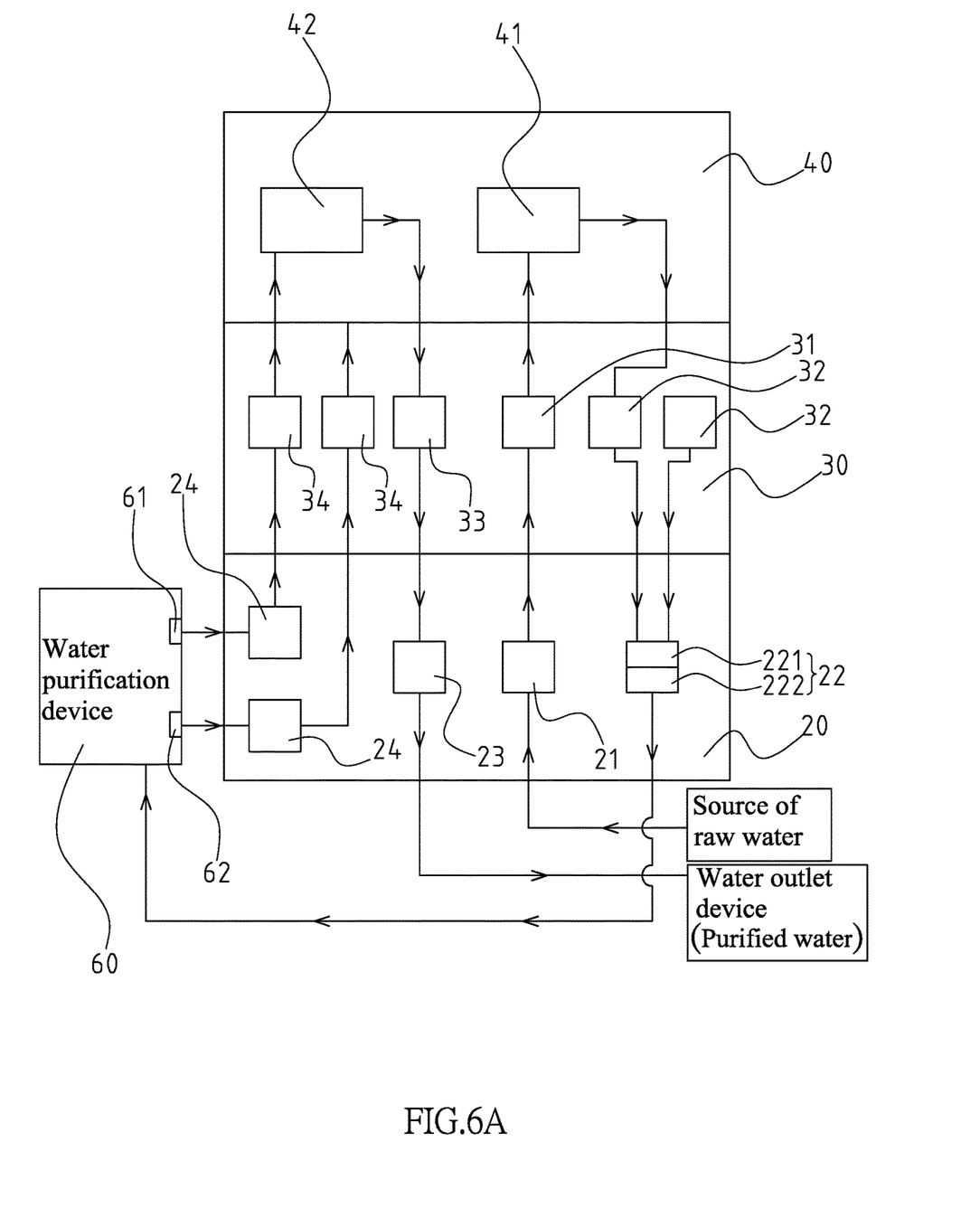
FIG. 6A is a schematic diagram of the flow channel of the present invention in a first water discharge state.
Figure 6B:
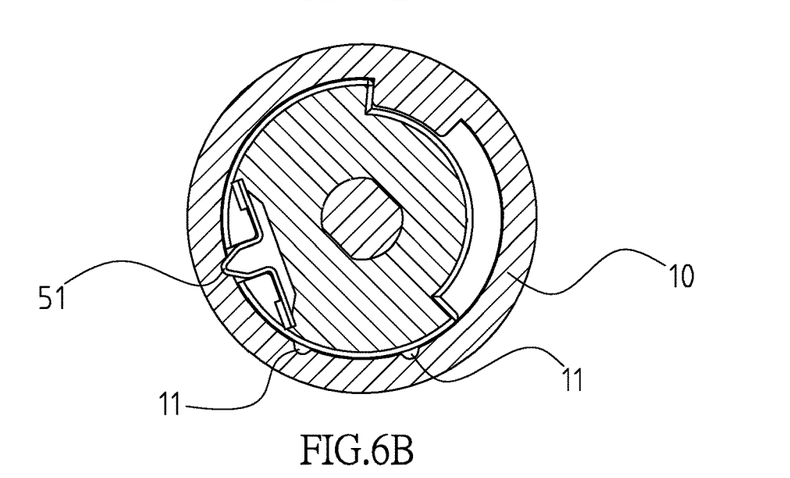
FIG. 6B is a schematic diagram of the manipulation assembly in clamping and positioning of the present invention in a first water discharge state.
Figure 7:
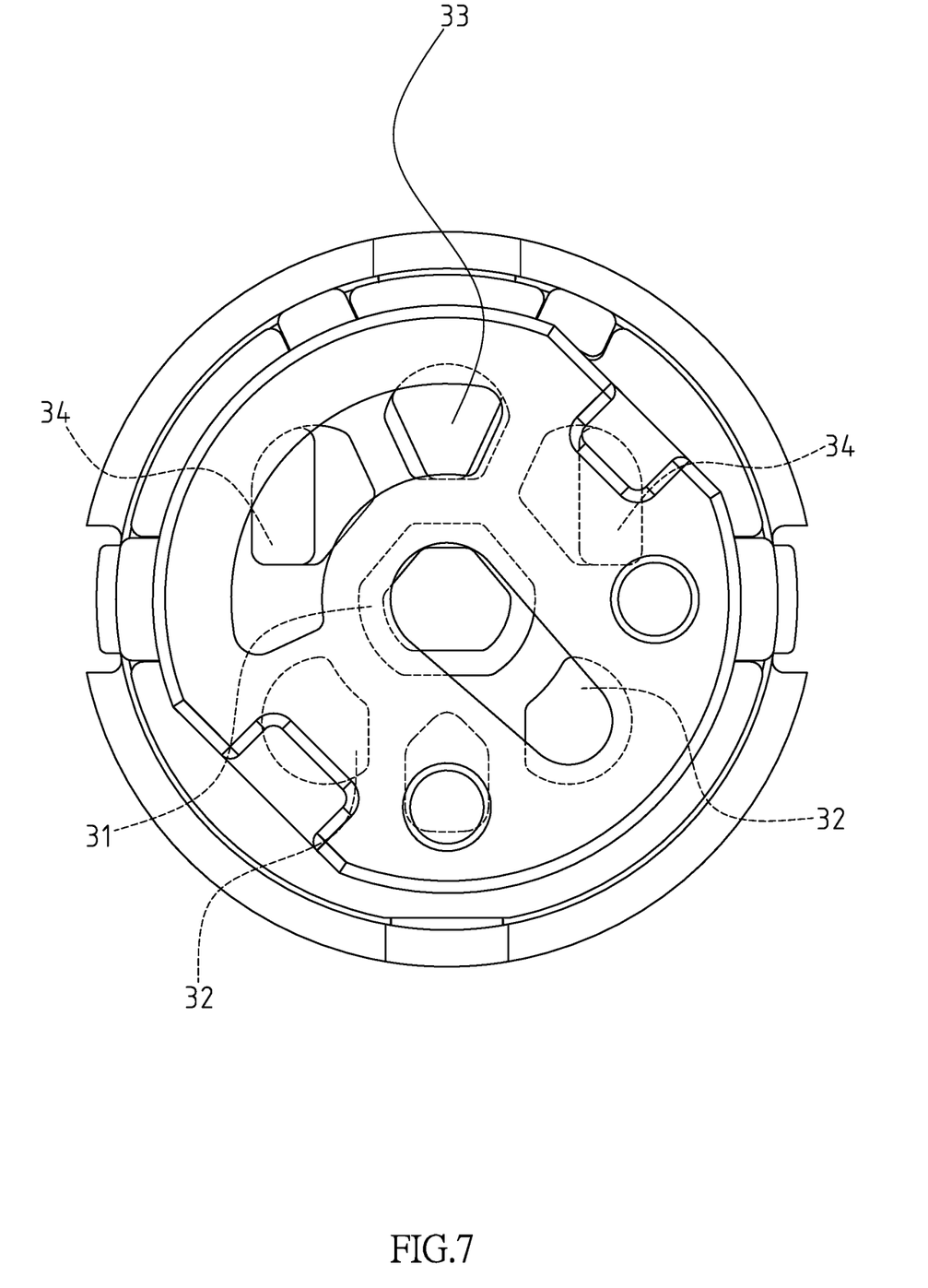
FIG. 7 is a schematic diagram showing another action of the present invention in a second water discharge state.
Figure 7A:
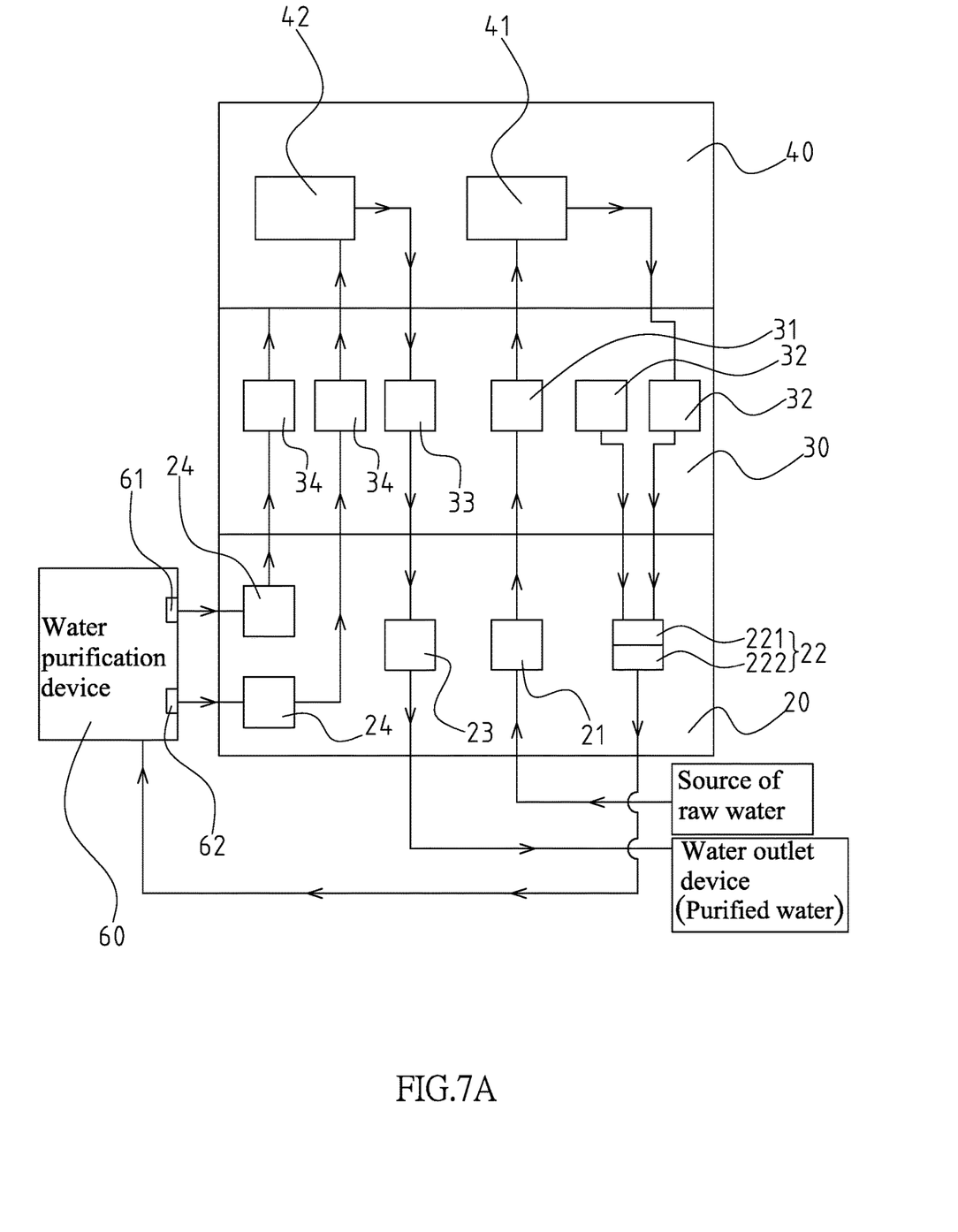
FIG. 7A is a schematic diagram of the flow channel of the present invention in a second water discharge state.
Figure 7B:
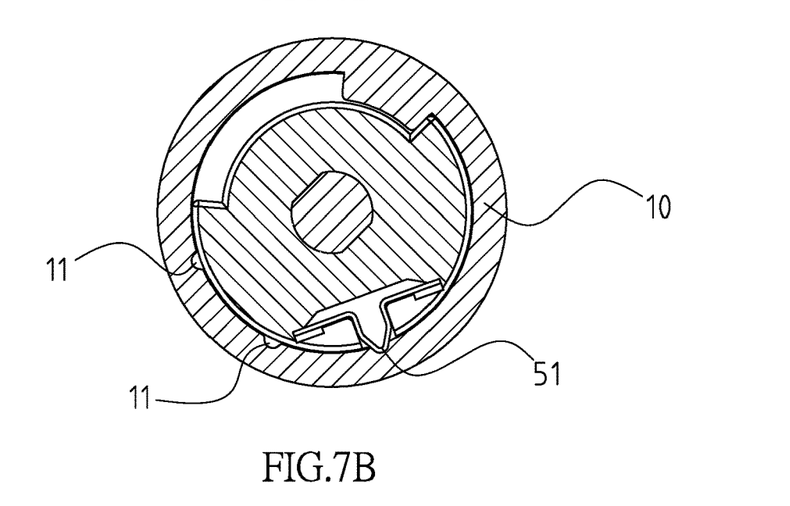
FIG. 7B is a schematic diagram of the manipulation assembly in clamping and positioning of the present invention in a second water discharge state.

Referring to FIGS. 6 and 7, the movable valve plate 40 comprises a first communicating groove 41 formed on the abutment surface of the fixed valve plate 30; the first end of the first communicating groove 41 and the first water-inlet channel 31 of the fixed valve plate 30 communicate with each other, and the second end of the first communicating groove 41 selectively communicates with the at least one first water-outlet channel 32 of the fixed valve plate 30; and a second communicating groove 42 formed on the abutment surface between the movable valve plate 40 and the fixed valve plate 30; the second communicating groove 42 and the second water-outlet channel 33 of the fixed valve plate 30 communicate with each other, and the second communicating groove 42 selectively communicates with the at least one second water-inlet channels 34 of the fixed valve plate 30. In a preferred embodiment of the present invention, the second communicating groove 42 selectively communicates with a corresponding second water-inlet channel 34 on the fixed valve plate 30. The second end of the first communicating groove 41 selectively communicates with a corresponding first water-outlet channel 32 on the fixed valve plate 30. As shown in FIG. 2, the first communicating groove 41 and the second communicating groove 42 penetrate through the movable valve plate 40 respectively, and the first end of the manipulation assembly 50 is configured on the movable valve plate 40 in a liquid tight mode.

Referring to FIGS. 2 and 5B, the first end of the manipulation assembly 50 is equipped with a clamping member 51, which is clamped in a corresponding groove 11, so as to temporarily position the manipulation assembly 50 relative to the housing 10.

The operation of the present invention is described as follows: as shown in FIGS. 5, and 5A, when the present invention is in the closed state, the second end of the first communicating groove 41 of the movable valve plate 40 is closed by the fixed valve plate 30.

Referring to FIGS. 4, 5, 6, and 6A, when a user uses the manipulation assembly 50 to rotate the movable valve plate 40 relative to the fixed valve plate 30 in the direction of the arrow R1 in FIG. 5, the second water-inlet channel 34 located in the first quadrant of the fixed valve plate 30 communicates with the second communicating groove 42, and communicates with the first water outlet 61 of the water purification device 60 through the corresponding second water-inlet channel 24 of the base 20, and the second water-outlet channels 32 located in the second quadrant of the fixed valve plate 30 are closed by the movable valve plate 40. In addition, the first water-outlet channels 32 located in the third quadrant of the fixed valve plate 30 communicate with the first communicating groove 41, and the first water-outlet channels 32 located in the fourth quadrant of the fixed valve plate 30 are closed by the movable valve plate 40. At this time, the unpurified raw water will sequentially pass through the first water-inlet channel 21 of the base 20 and the first water-inlet channel 31 of the fixed valve plate 30 to enter the first communicating groove 41 of the movable valve plate 40, and pass through the first water-outlet channels 32 located in the third quadrant of the fixed valve plate 30 and the first water-outlet channel 22 in the base 20 to enter the water purification device 60. At this time, since the second water-inlet channels 34 located in the second quadrant of the fixed valve plate 30 have been closed by the movable valve plate 40, the water purification device 60 can only send purified water through the first water outlet 61. The purified water sent from the water purification device 60 through the first water outlet 61 sequentially passes through the second water-inlet channels 24 in the base 20 corresponding to the first water outlet 61 and the second water-inlet channels 34 located in the first quadrant of the fixed valve plate 30 to enter the second communicating groove 42 of the movable valve plate 40, and then passes through the second water-outlet channel 33 in the fixed valve plate and the second water-outlet channel 23 in the base 20 to send to the water outlet device.

Referring to FIGS. 4, 5, 7, and 7A, when a user uses the manipulation assembly 50 to rotate the movable valve plate 40 relative to the fixed valve plate 30 in the direction of the arrow R2 in FIG. 5, the second water-inlet channel 34 located in the second quadrant of the fixed valve plate 30 communicates with the second communicating groove 42, and communicates with the second water outlet 62 of the water purification device 60 through the corresponding second water-inlet channel 24 of the base 20, and the second water-outlet channels 34 located in the first quadrant of the fixed valve plate 30 are closed by the movable valve plate 40. In addition, the first water-outlet channels 32 located in the fourth quadrant of the fixed valve plate 30 communicate with the first communicating groove 41, and the first water-outlet channels 32 located in the third quadrant of the fixed valve plate 30 are closed by the movable valve plate 40. At this time, the unpurified raw water will sequentially pass through the first water-inlet channel 21 of the base 20 and the first water-inlet channel 31 of the fixed valve plate 30 to enter the first communicating groove 41 of the movable valve plate 40, and pass through the first water-outlet channels 32 located in the fourth quadrant of the fixed valve plate 30 and the first water-outlet channel 22 in the base 20 to enter the water purification device 60. At this time, since the second water-inlet channels 34 located in the first quadrant of the fixed valve plate 30 have been closed by the movable valve plate 40, the water purification device 60 can only send purified water through the second water outlet 62. The purified water sent from the water purification device 60 through the second water outlet 62 sequentially passes through the second water-inlet channels 24 in the base 20 corresponding to the second water outlet 62 and the second water-inlet channels 34 located in the second quadrant of the fixed valve plate 30 to enter the second communicating groove 42 of the movable valve plate 40, and then passes through the second water-outlet channel 33 in the fixed valve plate and the second water-outlet channel 23 in the base 20 to send to the water outlet device.

In conclusion, the valve core described in this invention has the following advantages:

1. Prolonging the service life of the water purification device: the present invention is designed with an original flow channel, so, after the assembly is completed, the raw water delivery line is located at the front end of the water purification device, and, at the beginning of valve core design, static pressure test, liquid tightness test and water hammer test have been considered. Therefore, when the present invention is in the closed state, the water pressure in the pipeline can be blocked, the service life of the watertight component in the water purification device can be prolonged, and the maintenance frequency can be reduced.

2. Avoidance of purified water mixing with raw water: the present invention sets its closed tap position between its two water output tap positions. Therefore, when the two water output tap positions are exchanged, it is certain to return to the closed tap position, and the phenomenon of purified water mixed with raw water can be avoided.

3. Multiple uses: since the base of the present invention is provided with two (purified water) second water inlet channels, and the two second water inlet channels on the base are respectively connected to the two water outlets of the water purification device, the water purification device can be installed with two filter cores. For example, the purified water provided by the first water outlet passes through a single filter core, and the purified water provided by the second water outlet passes through two filter cores, so that different water output tap positions can be selected according to the actual needs of the user, which can prolong the service life of the filter core of the water purification device. In addition, the two filter cores can also be set as different water purification functions. Using independent flow channels to connect to the first water outlet and the second water outlet respectively can equally produce purified water of different purification levels by choosing different water output tap positions.

I claim:

1. A valve core comprising:
   a housing having a hollow cylindrical structure with an open end and a through end;
   a base which is mounted on the housing to close the open end of the housing, said base comprising:
   a first water-inlet channel axially formed at a central portion of said base, said first water inlet channel adapted to connect to a source of water;
   a first water-outlet channel axially formed on an outer edge of said first water-inlet channel, said first water-outlet channel adapted to connect to a water inlet of a water purification device, said first water-outlet channel having an arc-shaped groove which is arranged corresponding to a contour of a fixed valve plate and a water outlet is formed on a bottom surface of the arc-shaped groove, wherein the water outlet is adapted to connect to a water inlet of the water purification device;
   a second water-outlet channel axially formed on an outer edge of said first water-inlet channel and adapted to connect to a water outlet structure; and
   at least one second water-inlet channel axially formed on said base, said second water-inlet channel adapted to connect to at least one water outlet of the water purification device;
   a fixed valve plate mounted on said base, wherein said fixed valve plate is unable to rotate relative to said base, said fixed valve plate comprising:
   a first water-inlet channel axially formed at a central portion of said fixed valve plate, said first water-inlet channel of said fixed valve plate and said first water-inlet channel of said base being in communication with each other;
   at least one first water-outlet channel axially formed on said fixed valve plate, said at least one first water-outlet channel of said fixed valve plate and said first water-outlet channel of said base in communication with each other;
   a second water-outlet channel axially formed on said fixed valve plate, said second water-outlet channel of said fixed valve plate and said second water-outlet channel of said base being in communication with each other; and
   at least one second water-inlet channel axially formed on said fixed valve plate, said least one second water-inlet channel of said fixed valve plate and said second water-inlet channel of said base being in communication with each other;
   a movable valve plate rotationally arranged on said fixed valve plate, said movable valve plate comprising:
   a first communicating groove formed on an abutment surface between said movable valve plate and said fixed valve plate, a first end of said first communicating groove and said first water-inlet channel of said fixed valve plate being in communication with each other, a second end of said first communicating groove selectively in communication with said at least one first water-outlet channel of said fixed valve plate; and
   a second communicating groove formed on the abutment surface between said movable valve plate and said fixed valve plate, said second communicating groove and said second water-outlet channel of said fixed valve plate being in communication with each other, said second communicating groove selectively in communication with said at least one second water-inlet channels of said fixed valve plate; and a manipulation assembly having one end thereof configured on said movable valve plate so as to manipulate said movable valve plate to rotate relative to said fixed valve plate, another end of said manipulation assembly extending so as to as to penetrate the through end of said housing.

2. The valve core of claim 1, wherein both ends of said second water-outlet channel of said base are respectively formed with a second water-inlet channel, the two second water-inlet channels of said base are respectively adapted to connect to a corresponding water outlet on the water purification device, wherein both ends of said second water-outlet channel of said fixed valve plate are respectively formed with a second water-inlet channel, the second water-inlet channels of said fixed valve plate and the corresponding second water-inlet channel on said base being in communication with each other, the second communicating groove selectively communicating with a corresponding second water-inlet channel on said fixed valve plate, wherein two ends of the arc-shaped groove are extended respectively toward the second water-inlet channel of said base, and wherein two first water-outlet channels are formed on said fixed valve plate, each of the first water-outlet channels on said fixed valve plate communicating with the corresponding end of the arc-shaped groove, and wherein a second end of the first communicating groove selectively communicates with said at least one first water-outlet channel of said fixed valve plate.

3. The valve core of claim 2, wherein an end surface of said movable valve plate attached to said fixed valve plate is divided into four quadrants, the two second water-inlet channels of said fixed valve plate are respectively located in a first quadrant and a second quadrant of the four quadrants, wherein the two first water-outlet channels of said fixed valve plate are respectively located in a third quadrant and a fourth quadrant of the four quadrants, wherein the second water-inlet channels on the first quadrant correspond to the first water-outlet channels on the third quadrant when in use, and wherein the second water-inlet channel on the second quadrant corresponds to the first water-outlet channels on the fourth quadrant when in use.

\* \* \* \* \*